US010348813B2

(12) United States Patent
Abali et al.

(10) Patent No.: US 10,348,813 B2
(45) Date of Patent: Jul. 9, 2019

(54) PROVISIONING A BARE-METAL SERVER

(71) Applicant: INTERNATIONAL BUSINESS MACHINES CORPORATION, Armonk, NY (US)

(72) Inventors: Bulent Abali, Tenafly, NJ (US); Paul G. Crumley, Yorktown Heights, NY (US); Hubertus Franke, Cortlandt Manor, NY (US); Chung-Sheng Li, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 267 days.

(21) Appl. No.: 15/337,791

(22) Filed: Oct. 28, 2016

(65) Prior Publication Data
US 2018/0124163 A1    May 3, 2018

(51) Int. Cl.
*G06F 15/16* (2006.01)
*H04L 29/08* (2006.01)
*H04L 12/24* (2006.01)

(52) U.S. Cl.
CPC ...... *H04L 67/1002* (2013.01); *H04L 41/0806* (2013.01); *H04L 67/303* (2013.01); *H04L 67/327* (2013.01)

(58) Field of Classification Search
CPC ............ H04L 41/0806; H04L 67/1002; H04L 67/303; H04L 67/327
See application file for complete search history.

(56) References Cited

U.S. PATENT DOCUMENTS

| 8,443,077 | B1 | 5/2013 | Lappas et al. |
| 8,462,780 | B2 | 6/2013 | Vincent et al. |
| 8,473,731 | B2 | 6/2013 | Bogner et al. |
| 8,874,848 | B2 | 10/2014 | Soundararajan et al. |
| 9,152,200 | B2 | 10/2015 | Parthasarathy |
| 9,575,798 | B2 * | 2/2017 | Terayama ........... H04L 12/4641 |

(Continued)

OTHER PUBLICATIONS

Anonymous, "Technique for Dynamically Allocating Resources in a Heterogeneous Hypervisor Environment for a Given Hardware Architecture," IP.com Prior Art Database Technical Disclosure, IPCOM000236199D, Apr. 11, 2014.

*Primary Examiner* — Moustafa M Meky
*Assistant Examiner* — Thorne E Waugh
(74) *Attorney, Agent, or Firm* — Intelletek Law Group, PLLC; Gabriel Daniel, Esq

(57) ABSTRACT

A method and device for provisioning bare-metal servers to tenants of a cloud provider is provided. The cloud provider operating a datacenter receives a profile of a tenant. The cloud provider identifies a set of physical resources subscribed by the tenant based on the tenant's profile and identifies a bare-metal server in the datacenter having sufficient physical resources to provide the subscribed physical resources. The cloud center reports to the tenant a set of physical resources in the BM server that corresponds to the subscribed set of physical resources. The cloud center receives a request from the tenant to provision a tenant bare metal machine in the datacenter. The cloud center enables at least one of the reported physical resources in the bare-metal server for the tenant, based on the request, and disables remaining reported physical resources in the bare-metal.

9 Claims, 13 Drawing Sheets

(56) References Cited

U.S. PATENT DOCUMENTS

| | | | |
|---|---|---|---|
| 9,741,005 B1* | 8/2017 | Adogla | G06Q 10/0635 |
| 2002/0010798 A1* | 1/2002 | Ben-Shaul | H04L 29/12066 |
| | | | 709/247 |
| 2013/0282419 A1 | 10/2013 | Braddy et al. | |
| 2015/0205588 A1* | 7/2015 | Bates | G06F 9/4552 |
| | | | 717/145 |
| 2015/0263887 A1* | 9/2015 | Sajeepa | H04L 41/0803 |
| | | | 709/220 |
| 2015/0324182 A1 | 11/2015 | Barros et al. | |
| 2016/0004551 A1* | 1/2016 | Terayama | G06F 9/5011 |
| | | | 718/1 |
| 2017/0235613 A1* | 8/2017 | Smola | G06F 9/5083 |
| | | | 718/1 |
| 2018/0113734 A1* | 4/2018 | Yamato | H04L 67/10 |

\* cited by examiner

PROVISIONING A BARE-METAL SERVER

BACKGROUND

Technical Field

The present disclosure generally relates to methods and systems for providing tenant access to resources in a cloud provider. More specifically, the present disclosure relates to provisioning bare-metal servers based on tenant-user requests.

Description of the Related Art

Cloud computing and storage solutions provide users with various capabilities to store and process their data in data centers that may be located far from the user. Cloud computing provides users access to powerful computing and network resources without having to incur the cost of purchasing the equipment.

SUMMARY

In one embodiment, a method of provisioning bare-metal (BM) servers to tenants of a cloud provider is provided. The cloud provider operating a datacenter receives a profile for a tenant. The cloud provider identifies a set of physical resources subscribed by the tenant based on the tenant's profile and identifies a bare-metal server in the datacenter having sufficient physical resources to provide the subscribed physical resources. The cloud center reports to the tenant a set of physical resources in the BM server that corresponds to the subscribed set of physical resources while hiding from the tenant physical resources in the BM server that do not correspond to the subscribed set of physical resources. The cloud center receives a request from the tenant to provision a tenant bare metal machine in the datacenter. The cloud center enables at least one of the reported physical resources in the bare-metal server for the tenant based on the request and disables remaining reported physical resources in the bare-metal sever.

In some embodiments, the cloud provider receives a request from a tenant to provision a tenant bare metal machine. The cloud provider provides a set of configuration data for configuring a bare-metal server to implement the tenant BM machine according to the request. The bare-metal server has physical resources and physical switches. The set of configuration data allocates a set of the physical resources in the BM server for implementing the tenant BM machine and configures a set of the physical switches to electrically segregate the allocated set of physical resources from physical resources that are not allocated to the tenant.

Some embodiments of the disclosure provide a computing device that has a plurality of physical switches and a plurality of physical resources. A first set of physical resources in the plurality of physical resources is configured to implement a first bare-metal machine for a first tenant and a second set of physical resources in the plurality of physical resources is configured to implement a second bare metal machine for a second tenant. The physical switches are configured to electrically segregate the first set of physical resources from the second set of physical resources. The first set of physical resources is operating a first operating system and the second set of physical resources is operating a second operating system.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, the Summary, Detailed Description and the Drawings provided. Moreover, the claimed subject matter is not to be limited by the illustrative details in the Summary, Detailed Description and the Drawings, but rather is to be defined by the appended claims, because the claimed subject matter can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Bare-metal (BM) servers are hardware platforms in which customers are responsible for installing and operating the entire software stack. Cloud operators or providers, such as the IBM Softlayer®™, rent bare metal servers to customers or tenants. Offering bare-metal servers of varying capacities is an expensive goal to achieve. It requires either a large inventory of servers with varying capacities, or the servers that are built on-demand, which is laborious and time consuming. The cloud operator can also maintain an inventory of standardized bare-metal servers with uniform capacity such that each request for provisioning a bare-metal machine is fulfilled by a standardized bare-metal server. However, doing so requires either charging the customer for the entire server (so the customer pays for capacities that he doesn't use) or charging the customer for only the capacity that the customer uses (so the provider can't generate revenue off the unused capacity).

Some embodiments of the disclosure provide an on-line bare-metal server provisioning system that selectively enables and disables hardware or physical resources according to request and payment by a customer (also referred to as a renter or a tenant) of the cloud provider. The system hides from the customer hardware resources that the customer does not pay for. The system allows the customer to dynamically enable additional physical resources or disable already enabled physical resources after the bare-metal server has been provisioned and running. The system also dynamically disables resources after expiration of the rental period. The system may dynamically assign the hardware resources of one server to another server by enabling memory and I/O switch, thereby increasing hardware resource utilization.

Figure 1:
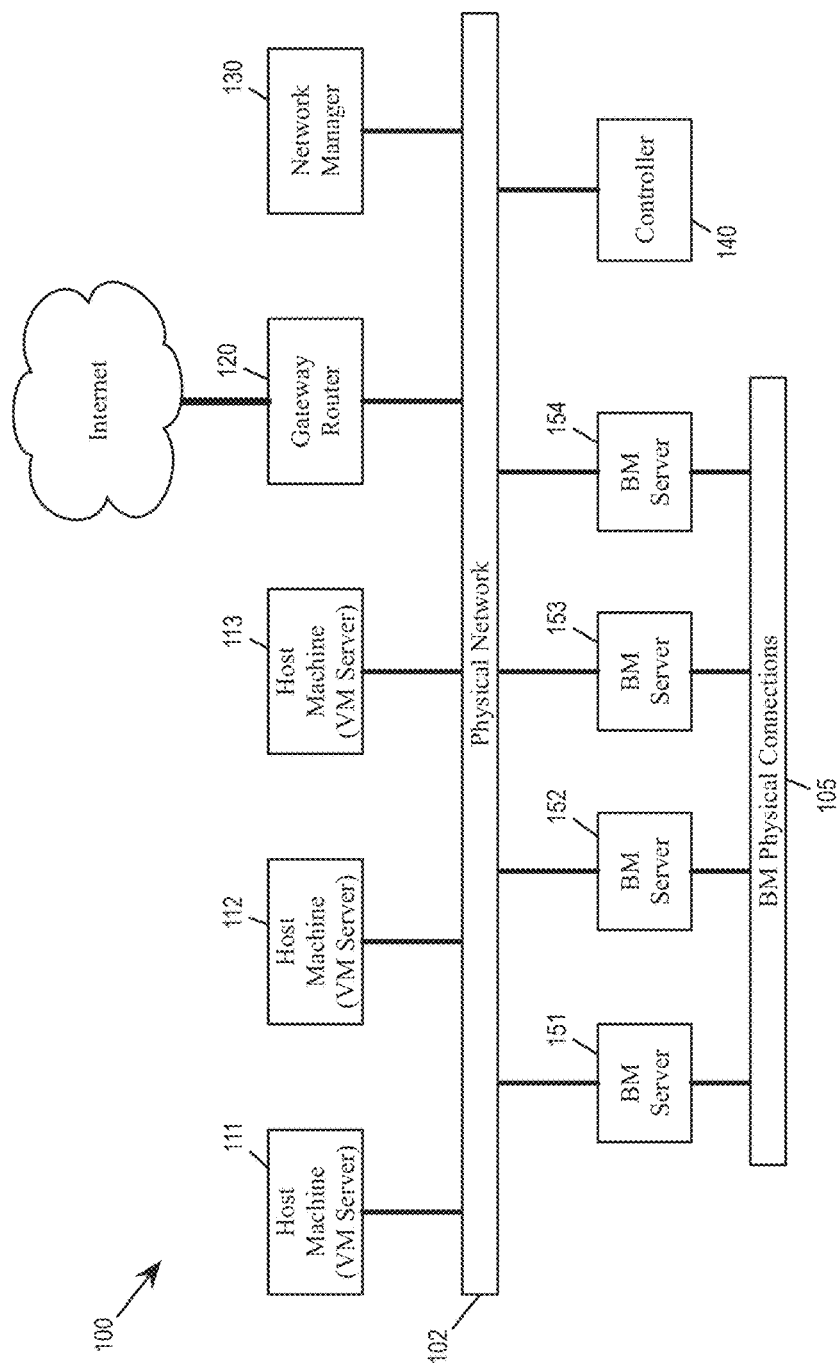
FIG. 1 illustrates a cloud provider that includes an on-line bare-metal provisioning system.

FIG. 1 illustrates a cloud provider 100 that includes an on-line bare-metal provisioning system. The cloud provider 100 is a datacenter that is accessible from the Internet, hence available for access over the cloud. As illustrated, the datacenter 100 has various network nodes that are interconnected by a physical network 102. These interconnected network nodes include several virtual machine (VM) servers 111-113, a gateway router 120 connected to the Internet, a network manager 130, a controller 140, and several bare-metal (BM) servers 151-154. The BM servers 151-154 are interconnected by BM physical connections or switches 105.

The physical network 102 is a communications infrastructure of the datacenter 100. It supports packet traffic between the network nodes that it interconnects. It may include one or more types of communications mediums, whether wired (e.g., Ethernet) or wireless (e.g., WiFi or Bluetooth). The physical network 102 allows the computing devices of the datacenter 100 to communicate with each other through packet traffic. The physical network 102 also communicates with the external world (i.e., the Internet) through the gateway router 120, thereby making the datacenter a cloud provider and its computing resources accessible to its tenants through the cloud.

A VM server (111-113), also known as a host machine, is a computing device that executes an operating system that allows it to host or operate virtual machines for one or more tenants. Such an operating system is also known as a hypervisor or virtual machine monitor, which serves as a common platform for all VMs running on the computing device such that each VM operates its software stack on top of the hypervisor. The datacenter or cloud provider typically provides the hypervisor operating system, since it is common to all tenants.

A BM server (151-154) is a hardware platform in which the provider provides only hardware but no operating system (hence referred to as bare-metal). A BM server is equipped with an array of configurable physical resources and configurable physical switches that can be used to form one or more tenant BM machines based on provisioning requests from tenants. A tenant user using a BM server is responsible for installing its own operating systems (referred to as customer operating system or tenant operating system) and its own software stacks for its own BM machines.

The set of BM physical connections 105 interconnects the BM servers 151-154. The BM physical connections 105 include a fabric of physical switches that interconnects the BM servers. The physical switches implement a switching protocol for interconnecting CPUs with memories, and CPUs with I/O devices. The BM physical connections 105 are for directly relaying signals and data between the BM servers. In some embodiments, the BM physical connection is a local bus that follows a local bus protocol such as Peripheral Component Interconnect Express (PCIe) rather than a packet traffic protocol such as Ethernet. The BM physical connections 105 allow the physical resources of the BM servers 151-154 to be pooled together as a BM resource pool. This allows the provisioning of BM machines by using physical resources from multiple BM servers and increases resource utilization.

The network manager 130 is an entity of the datacenter that is responsible for providing an interface to tenant users of the datacenter and for provisioning computing and network resources based on tenant requests. The controller 140 is an entity of the cloud provider that controls the real-time operation of the computing devices of the datacenter. The tenant users of the datacenter use the network manager 130 to provision VMs, BM machines, virtual switches, virtual routers, and other types virtual or physical network entities at the computing devices of the datacenter 100. The network manager, upon receiving a provision request for a network entity, generates the configuration data for network entities requested. The network manager delivers the generated configuration data to the computing devices that are slated to host or operate the requested network entity. The controller 140 in turn controls the real-time operations of the provisioned entities. In some embodiments, the controller 140 and the network manager 130 are themselves VMs hosted by one of the VM servers.

In some embodiments, the cloud provider provides BM servers as pre-built servers with more physical resources than what is specified in an average provisioning request for a BM machine. The pre-built bare-metal servers have more processor cores, more memory, and more I/O peripherals than what is specified in an average request. For example, if N bytes of memory is what customers of the datacenter requests on average, then the pre-built machines would have at least 2N bytes of memory. In some embodiments, the BM provisioning system selectively enables a subset of the available physical resources in the BM server based on a customer profile, which in some embodiments, specifies what and how much physical resources that the customer has subscribed (i.e., paid for). Resources that are not subscribed by the tenant are either disabled or electrically segregated from the subscribed resources. The cloud provider hides from the customer the physical resources that the customer has not subscribed.

In some embodiments, the BM provisioning system has control of physical switching hardware such as memory switching hardware, I/O peripheral switching hardware, and socket switching hardware. A secure management tool that is not visible to the customers controls the switching hardware. The switching hardware can be selectively enabled or disabled to create a smaller or larger BM machine out of the memory, I/O peripheral, processor core, and processor socket components.

Figure 2:
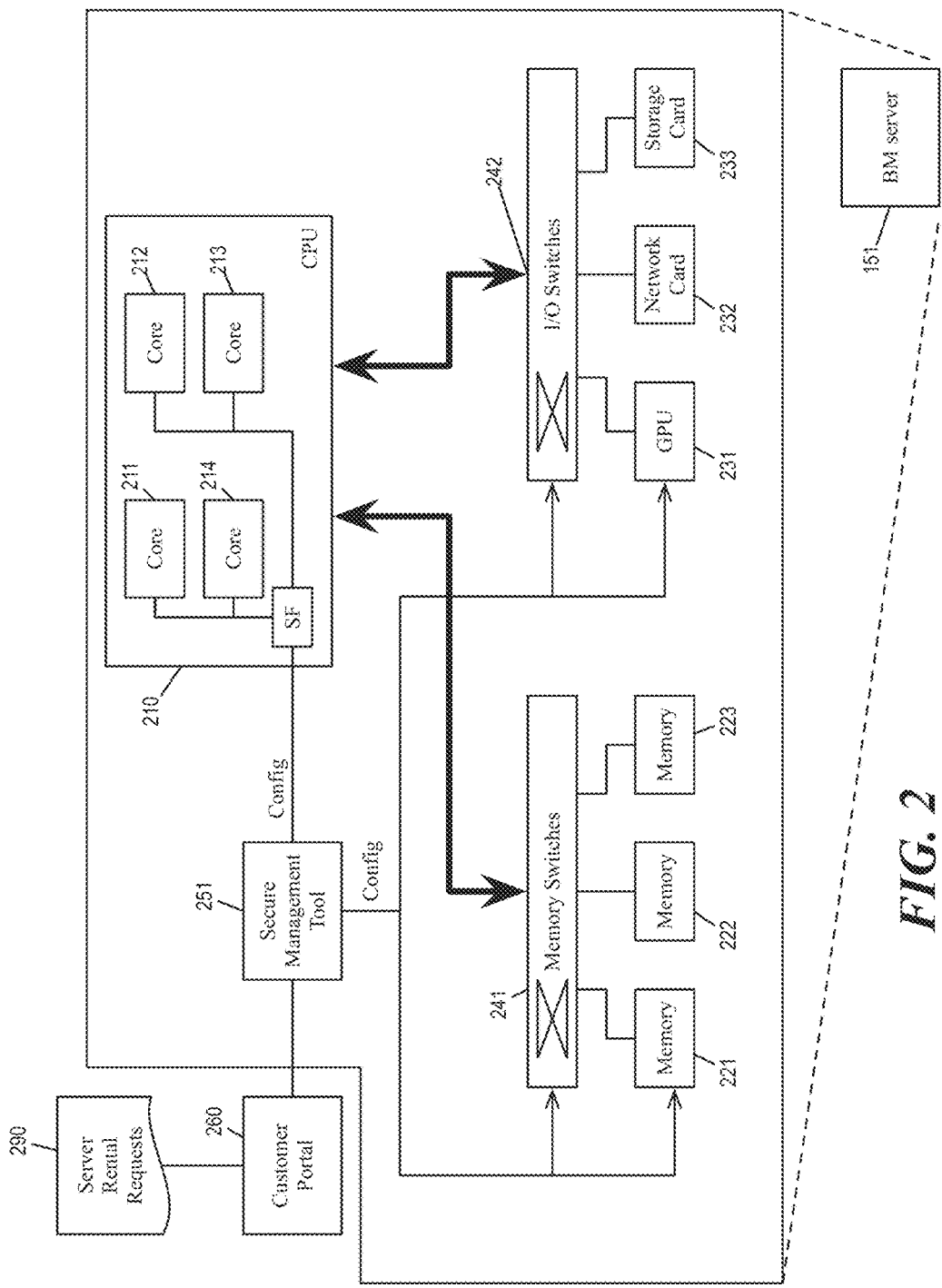
FIG. 2 illustrates a block diagram of a bare-metal server, consistent with an exemplary embodiment.

FIG. 2 illustrates a block diagram of a BM server. Specifically, the figure illustrates the components of the BM server 151. The BM server 151 includes configurable physical resources and physical switches that can be part of a provisioned BM machine. Such a BM machine is bare-metal because it does not have an operating system until a tenant user provides or specifies its own customer operating system. Furthermore, all physical resources forming a BM machine of a tenant run only the software of that tenant and process only the data of that tenant. The physical resources of a tenant's BM machine are not shared with any other tenant.

The BM server 151 has several physical resources, including a CPU 210, a set of memory structures 221-223, and I/O (input/output) peripheral devices. The I/O peripheral devices include a graphical processing unit 231, a network card 232 (or physical network interface controller PNIC), and a storage card 233. The CPU 210 includes processing cores 211-214. These physical resources are actual physical hardware components or circuits, not virtual entities created by software.

The BM server also includes a set of configurable physical switches that interconnect these physical resources. These physical switches include a set of configurable memory switches 241 for connecting the CPU 210 with the memory structures 221-223, and a set of configurable I/O switches 242 for connecting the CPU 210 with the I/O peripheral devices 231-233. These physical switches allow the provisioning of a BM machine that comprises some but not all of the physical resources in the BM server 151. In other words, these physical switches allow the provisioning of a BM machine that includes a selected subset of the physical resources in the BM server 151.

The BM server 151 also includes a secure management tool (SMT) 251. The SMT 251 selectively enables physical resources of the BM server 151, i.e., the processor cores 211-214 in the CPU 210, the memory modules 221-223, and I/O peripherals 231-233. This selection is based on a tenant BM server rental request 290, which is received by a customer portal 260 and delivered to the SMT 251. The SMT 251, in turn, enables and disables physical resources according to the BM server rental request 290 through a private interface that is inaccessible to customer and customer software (including tenant operating systems). The SMT 251 enables only physical resources that are subscribed by the tenants, while disabling the physical resources that are not subscribed. The customer portal 260 receives the server rental request 290 from the customer over the Internet, hence allowing the configuration of the BM server 151 to be done online or over the cloud. In some embodiments, the network manager 130 provides the customer portal 260.

In some embodiments, a BM server may be partitioned to serve multiple tenants. For example, a 4-socket server can be physically partitioned into 2 two-socket servers, 4 one-socket servers, or some combination thereof, by breaking off socket-to-socket processor links. Furthermore, a single socket may be partitioned into sets of cores, each of which is assigned to a different customer. In some embodiments, the SMT configures the physical switches to electrically segregate the physical resources that are subscribed by the tenant from physical resources that are not subscribed by the tenant (e.g., rented to another tenant). Some of the physical resources and physical switches are enabled by discrete control signals, while some of the physical resources are enabled by configuration data provided by the SMT.

The SMT 251 maintains or generates configuration data for the physical resources in the BM server 151. These configuration data can include firmware or an initialization program for the physical resources, such as BIOS (basic I/O system) for CPUs. In some embodiments, the SMT 251 ensures that only the cloud provider has access to the configuration data of the physical resources, and that neither the tenant user nor the customer operating system have access to the configuration data. In some embodiments, the configuration data includes controls for I/O switches to the BM physical connection 105. These I/O switches allow physical resources across different BM servers to join and to form one BM machine. By ensuring that only the cloud provider has access to the configuration data, the SMT 251 also hides the control of the I/O switches from the tenant user and the customer operating system.

In some embodiments, the SMT 251 is a circuit in the BM server 151 but not a software module operated by the CPU 210. In some other embodiments, the SMT 251 is a secure software running on the CPU 210 (not visible to the customer) that may perform the logical equivalent of the switching hardware by enabling or disabling portions of the memory, and cores, sockets, and peripherals. In other word, the software based SMT is a secured hypervisor.

The SMT 251 generates a list of components of the BM server 151 that are available for the customer to use (while hiding components of the BM server 151 that are not available to the customer). In some embodiments, the SMT 251 also creates a total price for the listed components. The total and the itemized prices are sent back to the customer portal 260 and the customer is billed accordingly.

As mentioned, the resources of the individual BM servers are pooled together, and the BM provisioning system is free to employ physical resources in different BM servers when provisioning a BM machine for a tenant. The pooling is made possible by the physical connections between the different BM servers (such as the BM physical connections 105).

Figure 3:
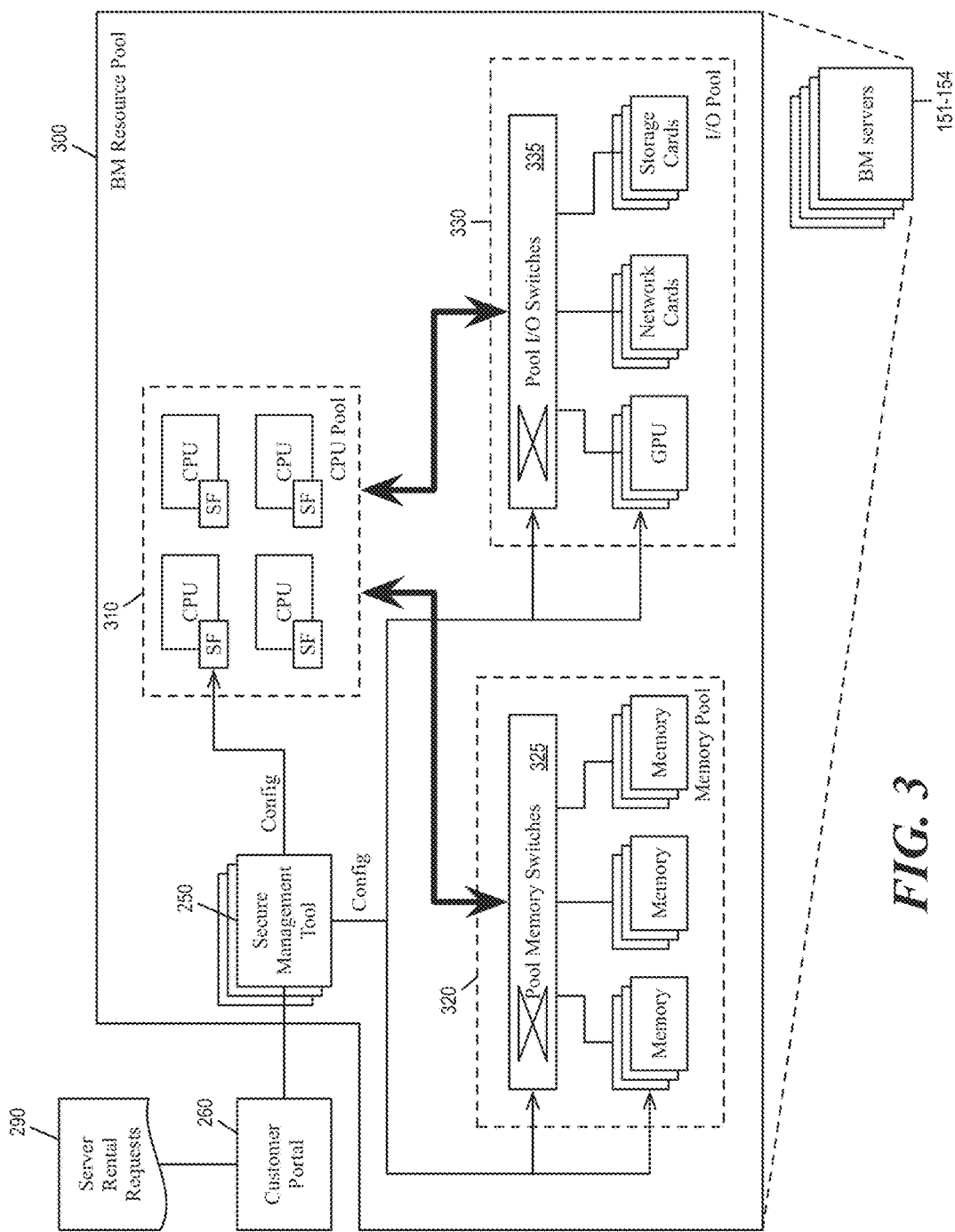
FIG. 3 conceptually illustrates the pooling of resources across multiple BM servers, consistent with an exemplary embodiment.

FIG. 3 conceptually illustrates the pooling of resources across multiple BM servers. As illustrated, the physical resources of the BM servers 151-154 are pooled together to form a BM resource pool 300. The pooled resources include a CPU pool 310, a memory pool 320, and an I/O pool 330. The CPU pool 310 includes CPUs from the BM servers 151-154. Likewise, the memory pool 320 includes memories from the BM servers 151-154, and the I/O pool 330 includes the GPUs, the network cards (PNICs), and the storage cards from the BM servers 151-154. The CPUs in the CPU pool 310 are connected with the memories in the memory pool 320 by pool memory switches 325. The CPUs in the CPU pool 310 are connected with the I/O peripherals in the I/O pool 330 by pool I/O switches 335.

The pool memory switches 325 include the configurable memory switches from individual BM servers 151-154 (such as the memory switches 241). The memory switches in the BM servers 151-154 are interconnected through the BM physical connection 105 and can therefore be conceptually regarded a pool of memory switches. Likewise, the pool I/O switches 325 include the configurable I/O switches in individual BM servers (such as the I/O switch 242). The I/O switches in the BM servers 151-154 are also interconnected through the BM physical connection 105 so can be conceptually regarded as a pool of I/O switches.

The pools of physical resources are controlled by the SMTs of individual BM servers (collectively referred to herein as SMTs 250). The SMTs 250 receive server rental request 290 from the customer portal 260 and determines which physical resources of which BM server shall be enabled and which ones should be disabled, based on the requesting customer's profile (e.g., rental or payment status).

Each SMT of a BM server then uses the BM server's private interface to enable and/or disable the BM's physical resources. This includes generating and providing configuration data or control signals for the physical resources and the physical switches within individual BM servers 151-154.

Figure 4:
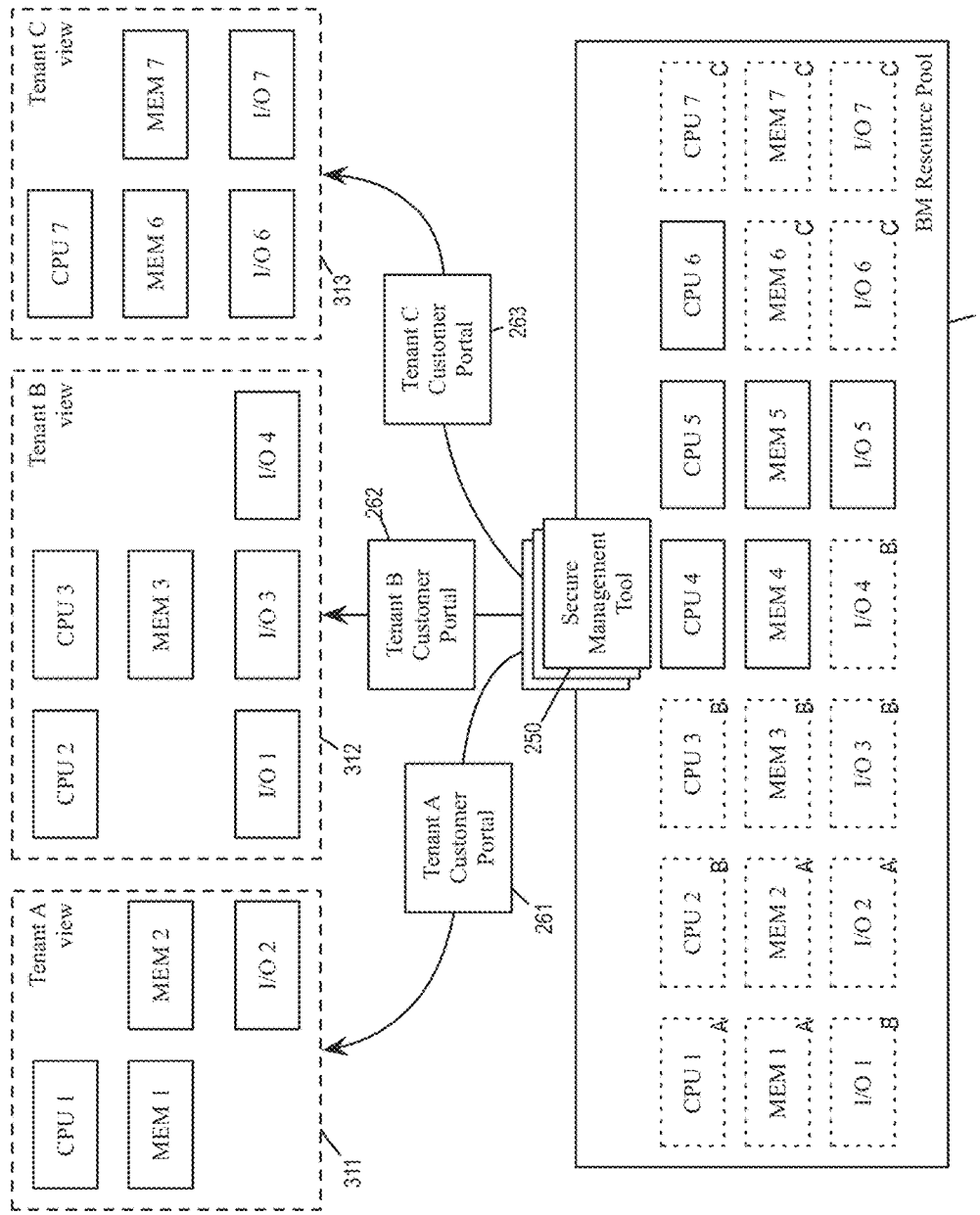
FIG. 4 illustrates the reporting of physical resources to tenants based on tenant's subscription, consistent with an exemplary embodiment.

FIG. 4 illustrates the reporting of physical resources to tenants based on tenant's subscription (i.e., rental or payment). The figure illustrates the BM resource pool 300 that includes physical resources from one or more BM servers (e.g., BM servers 151-154). The cloud provider has at least three tenants A, B, and C that are subscribers of BM servers of the cloud provider. The physical resources of the BM resource pool include processors (CPU1 through CPU7), memories (MEM1 through MEM7), and I/O peripherals (I/O1 through I/O7).

These physical resources, along with physical switches (not illustrated) are selectively enabled and configured by the SMTs 250. The SMTs receive BM provisioning requests from the tenants A, B, and C through the customer portals 261-263, respectively. As illustrated, tenant A has subscribed (i.e., paid for or rented) physical resources CPU1, MEM1, MEM2, and IO2. Tenant B has subscribed physical resources CPU2, CPU3, MEM3, IO1, IO3 and IO4. Tenant C has subscribed physical resources CPU7, MEM6, MEM7, IO6, and IO7. The physical resources CPU4, CPU5, CPU6, MEM4, MEM5, IO5 remain unsubscribed by any of the tenants.

For each tenant, the SMTs 250 generate a list of components in the BM resource pool 300 that are available for the tenant to use, while hiding components that are not available to the tenant. As illustrated, the SMTs 250 generate a report 311 for the tenant A in which CPU1, MEM1, MEM2, and IO2 are listed as available for the tenant to use. The SMTs 250 generate a report 312 for the tenant B in which CPU2, CPU3, MEM3, IO1, IO3 and IO4 are listed as available for the tenant to use. The SMTs 250 generate a report 313 for the tenant C in which lists CPU4, CPU5, CPU6, MEM4, MEM5, IO5 are listed available for the tenant to use. Each report hides from its respective tenant the physical resources that the tenant does not subscribe to and therefore unavailable for use. In some embodiments, each report also includes a total price for the components listed in the report. The total and the itemized prices are sent back to the customer portal 260 and the tenant is billed.

Figure 5:
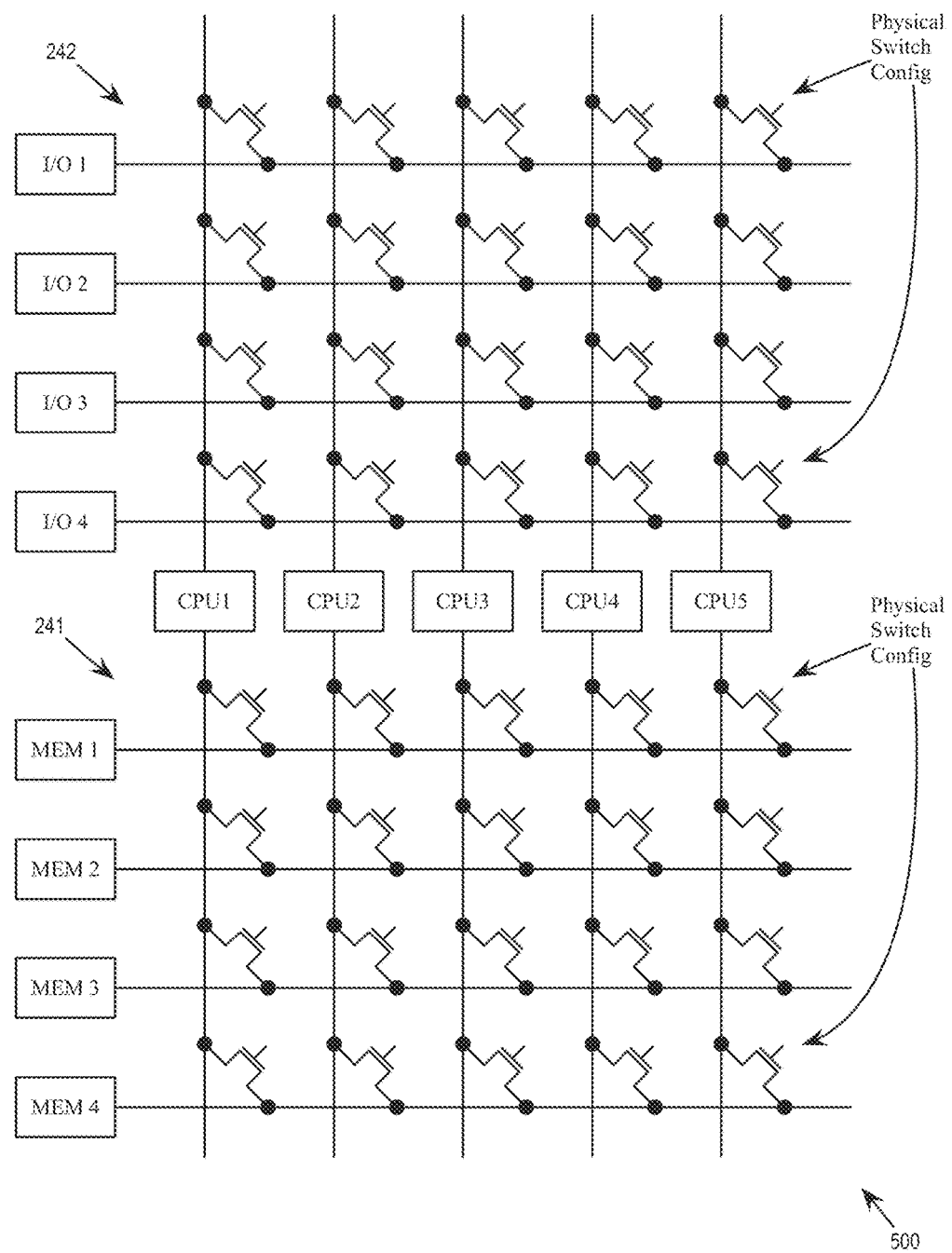
FIG. 5 illustrates configurable physical switches inside a BM server, consistent with an exemplary embodiment.

FIG. 5 illustrates configurable physical switches inside a BM server 500. The configurable physical switches can be used to enable the electrical or signal connection between physical resources of a BM server. The configurable physical switches can also be used to electrically segregate physical resources from each other. This allows a BM server to provide physical resources to multiple different tenants at the same time. This also allows physical resources of one BM server to be part of the BM resource pool and be included in a tenant BM machine that spans multiple BM servers.

As illustrated, the CPUs, the configurable memory switches 241 and the configurable I/O switches 242 are implemented as crossbars in which bridge between physical resources are implemented by transistor switches or bidirectional tri-state buffers. A physical resource can be made to be in electrical connection with another physical resource if the configuration data (supplied by the SMT of the BM server 500) allow the physical switches that bridge the two physical resources to conduct. Conversely, a physical resource can be electrically segregated from another physical resource if the configuration data disallow the physical switches that bridge the two physical resources to conduct.

Figure 6:
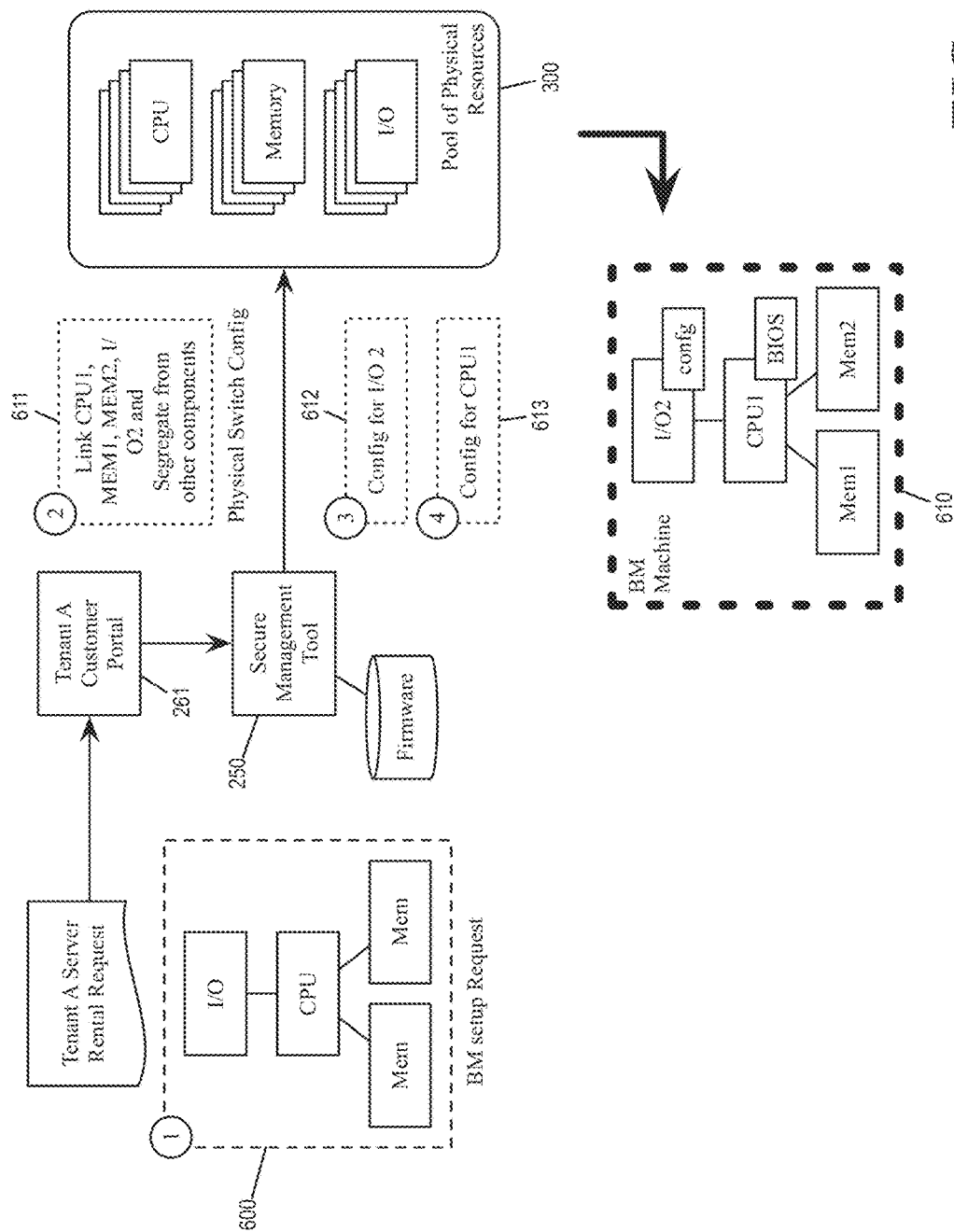
FIG. 6 illustrates the provisioning of a BM machine based on a tenant request, consistent with an exemplary embodiment.

FIG. 6 illustrates the provisioning of a BM machine based on a tenant request. The tenant BM server request specifies the types and the amount of physical resources that the tenant is requesting. The SMTs of BM servers in response identify and enable physical resources and provide the appropriate firmware or initialization program to the enabled physical resources. The figure illustrates the dataflow that take place during the creation of a BM machine in four operations labeled '1' through '4'.

At the operation labeled '1', the tenant produces a BM server rental request 600 in which the tenant requests the provision of a BM machine having one I/O peripheral, one CPU, and two memory units. The customer portal 260 relays the request to the SMTs 250. In some embodiments, the customer portal 260 identifies which BM server(s) has sufficient available physical resources for fulfilling the tenant request. The customer portal 260 therefore generates physical resource allocation requests to the SMT(s) of the identified BM server(s).

At the operation labeled '2', the SMTs 250 identify the physical resources in the BM servers (the pool of BM resources 300) that are used to fulfill the tenant's provisioning request. Specifically, the SMTs 250 identify the CPU1, MEM1, MEM2, and 102 as the physical resources from the BM resource pool 300 to fulfill the tenant's request. The SMTs 250 also generate configuration data 611 to the physical switches in the BM servers 300 in order to establish connections between the identified physical resources as well as to provide segregation from other physical resources that the tenant does not subscribe to.

At operations labeled '3' and '4', the SMTs 250 provide configuration data for the identified physical resources, including configuration data 612 to 102 and configuration data 613 to CPU1. These configuration data may include initialization program (BIOS) for the CPU as well as firmware for the I/O peripheral. The configuration data may also specify which CPU cores to use. Upon completion of the operation labeled '4', the SMTs 250 have created a BM machine 610 for the tenant comprising CPU1, MEM1, MEM2, and IO2 from the pool of physical resources 300.

Figure 7A:
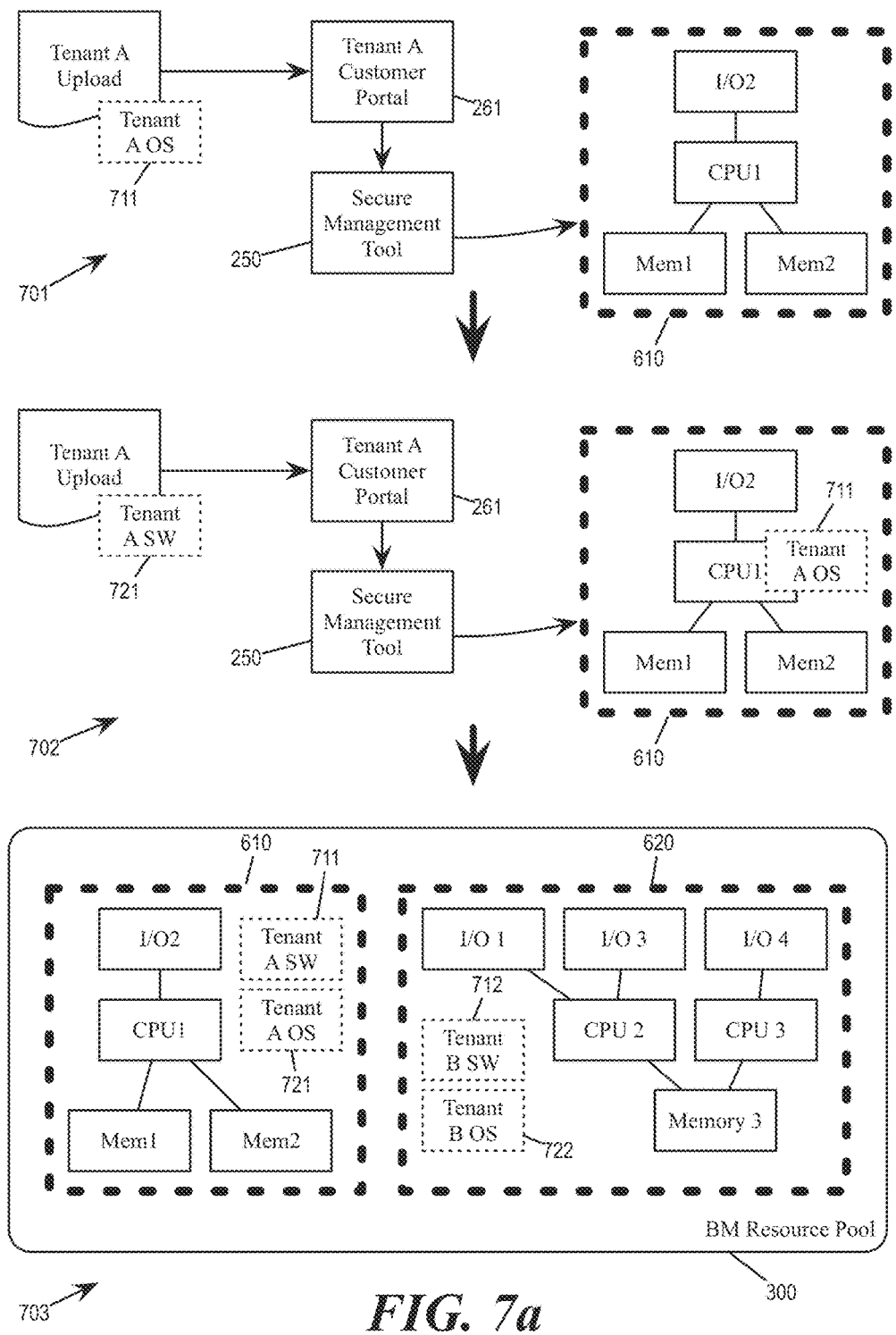
FIG. 7a illustrates the loading and execution of tenant software in provisioned BM machines, consistent with an exemplary embodiment.

FIG. 7a illustrates the loading and execution of tenant software in provisioned BM machines. A newly provisioned BM machine is without an operating system until the tenant specifies or supplies one. The figure illustrates the installation of software into a provisioned BM machine in three stages 701-703.

At the stage 701, the newly provisioned BM machine 610 of tenant A does not have any operating system or software stack. The tenant A loads a tenant operating system 711 through its customer portal 261. The SMTs 250 then install the tenant operating system 711 into the components of the BM machine 610.

At the stage 702, the BM machine 610 operates the tenant operating system 711, while tenant A uploads additional software 721 into the BM machine 610.

At the stage 703, the BM machine 610 operates the tenant A operating system as well as performing the tenant A applications. At the same time, tenant B has also provisioned a BM machine 620 that includes the physical resources CPU2, CPU3, IO1, IO3, IO4, and MEM3 from the same BM resource pool 300. The tenant B's BM machine 620 uses tenant operating system 712, which is provided by tenant B. It is also running a set of tenant B software 722 on top of the tenant B's operating system. The BM machine 610 and the BM machine 620 both use physical resources in the BM resources pool 300. However, the physical resources of the two BM machines are electrically segregated and hidden from each other such that the physical resources of tenant A's machine would not have access to tenant B's data and that tenant B's machine would not have access to tenant A's data. In addition, each BM machine is running its own operating system that is entirely determined by its owner-tenant.

Figure 7B:
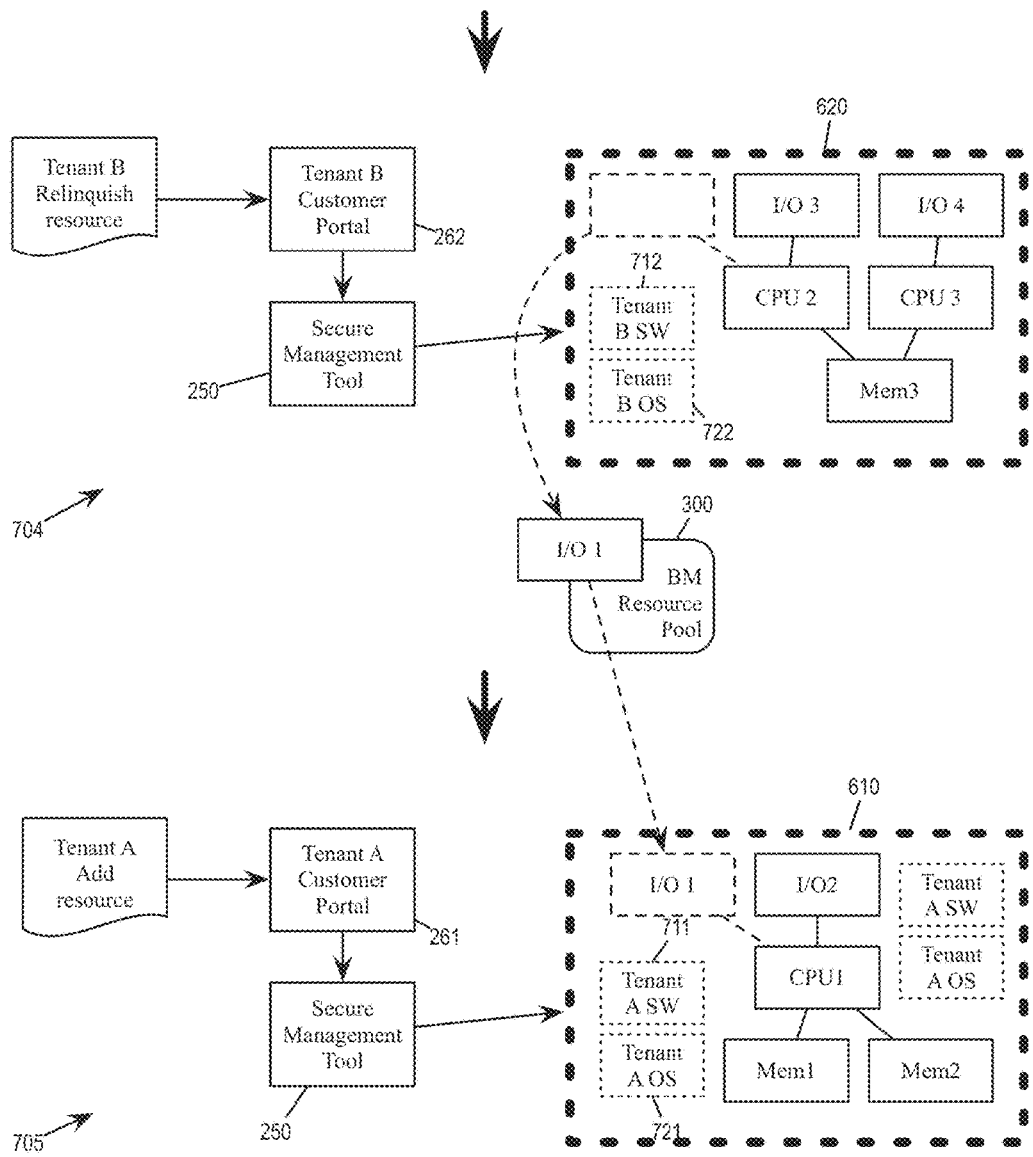
FIG. 7b illustrates the dynamic allocation and de-allocation of physical resources in BM servers, consistent with an exemplary embodiment.

FIG. 7b illustrates the dynamic allocation and de-allocation of physical resources in BM servers. In some embodiments, after a customer's request has been serviced and the server is up and running, the customer can make additional requests to add or remove components. In some embodiments, each tenant is allowed to dynamically enable additional physical resources or disable already enabled physical resources after the bare-metal server has been provisioned and running by enabling and disabling the physical switches. The BM provisioning system also dynamically disables resources after expiration of the rental period. The system may dynamically assign the hardware resources of one BM server to a BM machine in another BM server by enabling memory and I/O switch, thereby increasing hardware resource utilization.

FIG. 7b illustrates the dynamic allocation and de-allocation of physical resources in two stages 704 and 705. The stage 704 follows the stage 703 of FIG. 7a.

At the stage 704, tenant B dynamically relinquishes resources while its BM machine 620 is operating. Such relinquishment can be a direct command from the tenant user, but may also be a forced de-allocation by the cloud provider due to non-payment or expiration of a rental period. In some embodiments, if the tenant requests less capacity than what was already allocated to the tenant, the BM provisioning system would return the unused physical resource back to the pool of resources.

As illustrated, the SMT 250 receives the relinquish command (from the customer portal 262 or from the cloud server) and de-allocates the physical resource "IO1". The resource is thereby disabled from the BM machine 620 and joins the BM resource pool 300 as an unallocated physical resource. The SMTs 250 make the corresponding modification to the configuration data and control signals to release the physical resource "IO1" from the BM machine 620.

At the stage 705, tenant A dynamically requests additional resources while its BM machine 610 is operating. The request is for one additional I/O peripheral. The customer portal 261 for the tenant A, upon verifying that the requested additional resource is paid for, relays the request to the SMTs 250. The SMTs 250, in turn, identifies the physical resources that can fulfill the request. In this example, the SMTs 250 identify the I/O peripheral resource "IO1" as being an available matching physical resource in the BM resource pool 300. The SMTs 250 therefore generates the relevant configuration data and control signal to enable the physical resource "IO1" for the tenant A. The SMTs 250 also sets up the physical switches in the BM servers to establish the connection between "IO1" and other components of the BM machine 610, as well as to electrically segregate "IO1" from other physical resources, such as physical resources that are still under subscription of tenant B (i.e., IO3, IO4, CPU2, CPU3, MEM3).

Figure 8:
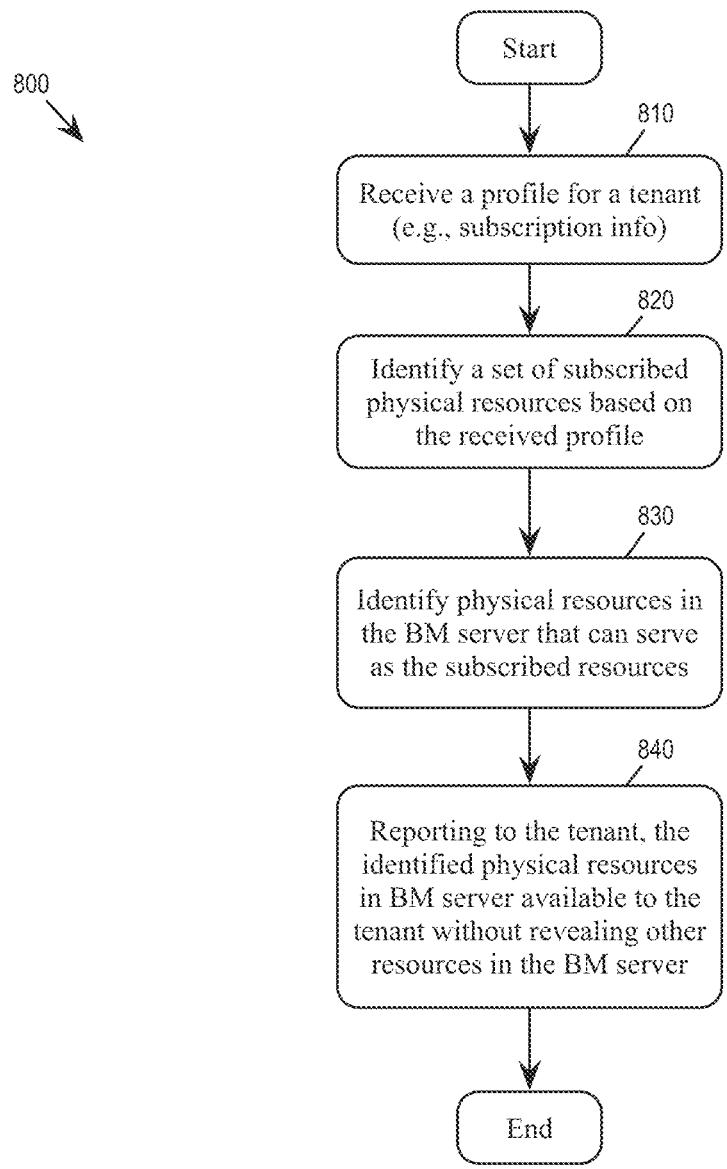
FIG. 8 conceptually illustrates a process for reporting available physical resources in BM servers to a tenant, consistent with an exemplary embodiment.

FIG. 8 conceptually illustrates a process 800 for reporting available physical resources in a BM server to a tenant. The BM provisioning system provides a list of components in the BM resource pool that are available for the tenant to use while hiding components that are not available to the tenant. In some embodiments, the SMT of each BM server performs the process 800 when queried by a tenant for available resources to provision a BM machine. In some embodiments in which the SMT is a software module operated by a processing unit, the processing unit performs the process 800 by executing instruction sets. For some embodiments in which the SMT is a hardware circuit in a BM server, the hardware circuit performs the process 800.

The process 800 starts by receiving (at 810) a profile of a tenant. Such a profile informs the process on the level of service subscribed by the tenant, as well as other information such as payment status. The process identifies (at 820) a set of subscribed physical resources in the BM server based on the received tenant profile, e.g., the number of CPUs, the amount of memory, the number and types of I/O peripherals that the tenant is entitled to, based on this subscription and payment information.

The process identifies (at 830) actual available physical resources in the BM server (i.e., the pool of physical resources) that can be used by the tenant. The process reports (at 840) to the tenant the identified physical resources in the BM server that are available to the tenant without revealing other resources in the BM server. In some embodiments, the report also includes a total price for the components listed in the report. The report is sent back to the customer portal and the customer is billed. The process 800 then ends. In some embodiments, the BM provisioning system combines several reports from the SMTs of several BM servers of a BM resource pool into one report that informs the tenant as to the resources in the entire BM resource pool that is available to him.

Figure 9:
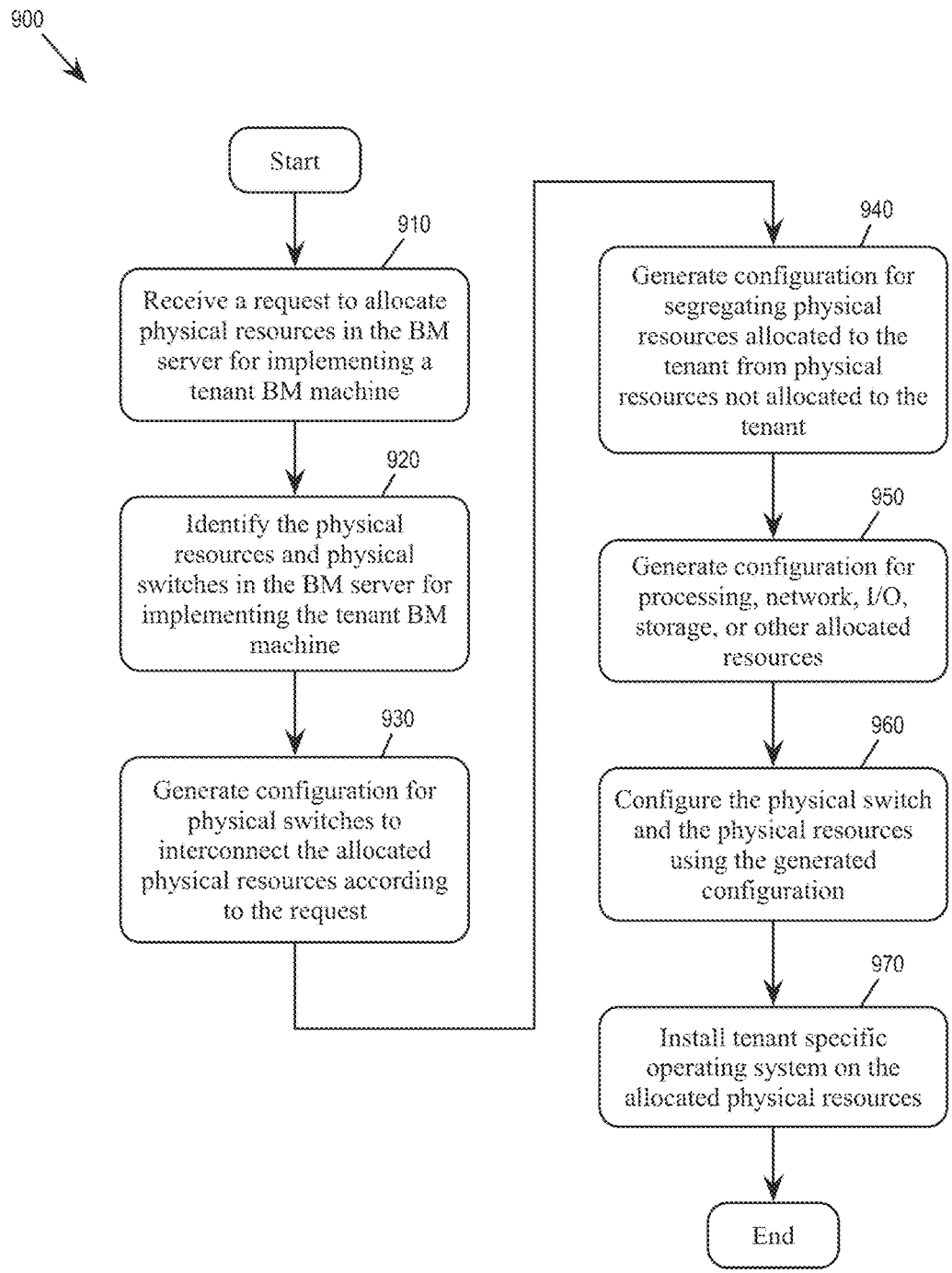
FIG. 9 conceptually illustrates a process for provisioning a BM machine by configuring BM servers to provide the salient physical resources, consistent with an exemplary embodiment.

FIG. 9 conceptually illustrates a process 900 for provisioning a BM machine by configuring BM servers to provide the necessary physical resources. In some embodiments, a SMT of a BM server performs the process 900 when provisioning a BM machine. In some embodiments in which the SMT is a software module operated by a processing unit, the processing unit performs the process 900 by executing instruction sets. For some embodiments in which the SMT is a hardware circuit in a BM server, the hardware circuit performs the process 900.

The process starts when it receives (at 910) a request to allocate physical resources in the BM server for implementing a tenant BM machine. The request may come from a customer portal of the tenant (operating in the network manager of the datacenter), which has decided that the BM server performing the process to be the most suitable BM server for fulfilling a tenant's request, or that the physical resources of the BM server are needed to form a larger BM machine that spans multiple BM servers. This request may also come from another SMT in another BM server that is provisioning a BM machine that spans multiple BM servers. The process then identifies (920) the physical resources and physical switches in the BM server that will be used to implement the tenant BM machine.

The process generates (at 930) a configuration for the physical switches to interconnect the allocated physical resources according to the request. The process also generates (at 940) a configuration for physical switches in order to segregate physical resources allocated to the tenant from physical resources not allocated to the tenant. This prevents the provisioned BM machine of a tenant from accessing physical resources that it did not subscribe or pay for. This also prevents the provisioned BM machine from accessing data not belonging to the tenant. The process also generates (at 950) configuration for processing, network, I/O, storage, or other allocated physical resources. This configuration data may include firmware or an initialization program such as BIOS for CPUs. The process then configures (at 960) the physical switch and the physical resources using the generated configuration from operations 930-950.

Once the physical resources and the physical switches have been configured, the process may receive an operating system (or a specification of one) from a tenant and installs (at 970) the operating system in the provisioned BM machine. The process may also install other tenant software or applications in the BM machine to be executed on top of the installed tenant operating system. The process 900 then ends.

It is noted that, provided that the result is substantially the same, the steps of the processes 800 and 900 are not required to be executed in the exact order shown in FIGS. 8 and 9.

Example Electronic System:

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
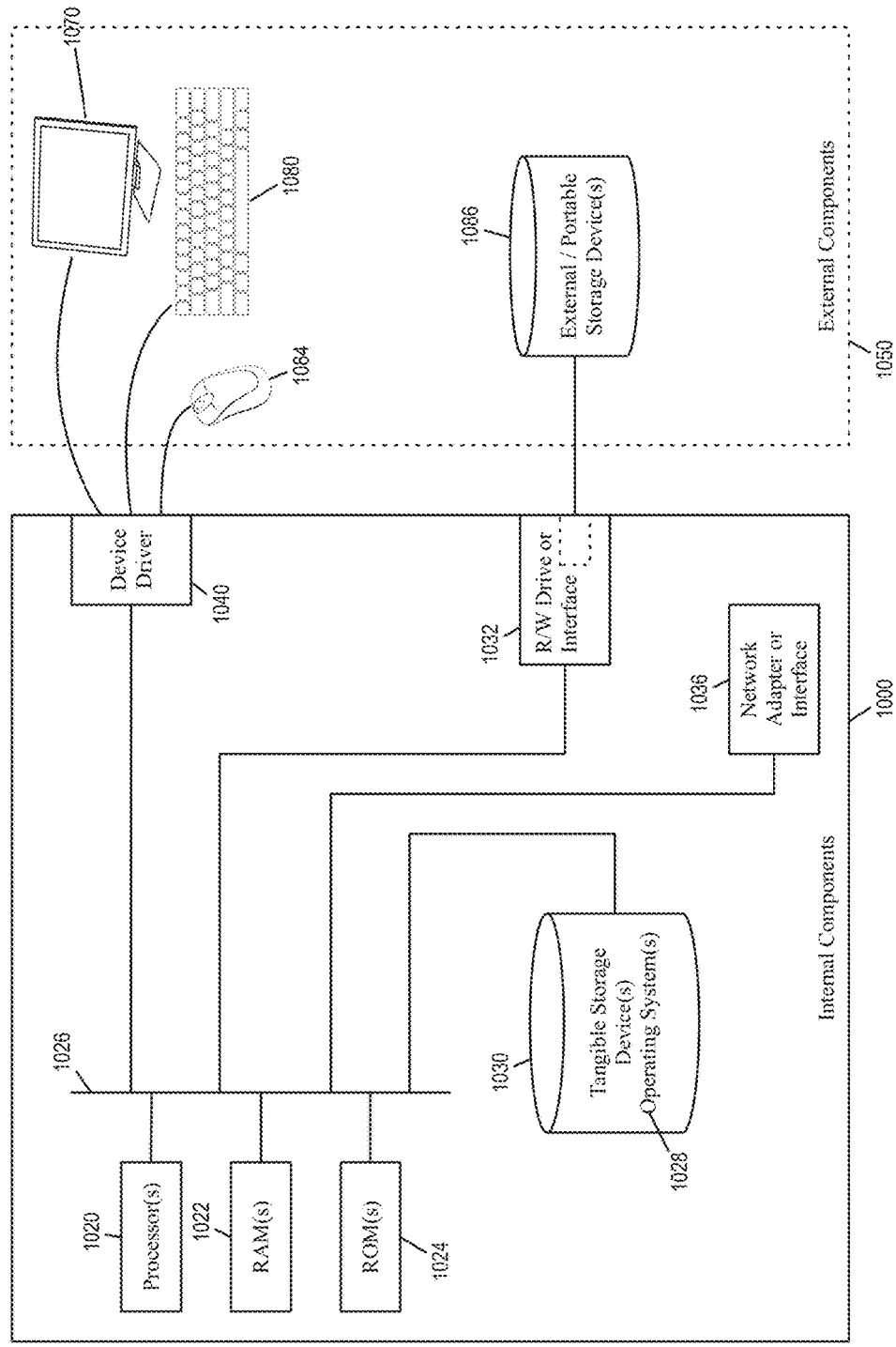
FIG. 10 shows a block diagram of the components of a data processing system in accordance with an illustrative embodiment of the present disclosure.

FIG. 10 shows a block diagram of the components of data processing systems 1000 and 1050 that may be included within the cloud datacenter 100 using the BM provisioning system in accordance with an illustrative embodiment of the present disclosure. It should be appreciated that FIG. 10 provides only an illustration of one implementation and does not imply any limitations with regard to the environments in which different embodiments may be implemented. Many modifications to the depicted environments may be made based on design and implementation requirements.

Data processing systems 1000 and 1050 is representative of any electronic device capable of executing machine-readable program instructions. Data processing systems 1000 and 1050 may be representative of a smart phone, a computer system, PDA, or other electronic devices. Examples of computing systems, environments, and/or configurations that may be represented by data processing systems 1000 and 1050 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1000 and 1050 may include a set of internal components 1000 and a set of external components 1050 illustrated in FIG. 10. The set of internal components 1000 includes one or more processors 1020, one or more computer-readable RAMs 1022 and one or more computer-readable ROMs 1024 on one or more buses 1026, and one or more operating systems 1028 and one or more computer-readable tangible storage devices 1030. The one or more operating systems 1028 and programs such as the programs for executing the processes 800 and/or 900 are stored on one or more computer-readable tangible storage devices 1030 for execution by one or more processors 1020 via one or more RAMs 1022 (which typically include cache memory). In the embodiment illustrated in FIG. 10, each of the computer-readable tangible storage devices 1030 is a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

The set of internal components 1000 also includes a R/W drive or interface 1032 to read from and write to one or more portable computer-readable tangible storage devices 1086 such as a CD-ROM, DVD, memory stick, magnetic tape, magnetic disk, optical disk or semiconductor storage device. The instructions for executing the processes 800 or 900 can be stored on one or more of the respective portable computer-readable tangible storage devices 1086, read via the respective R/W drive or interface 1032 and loaded into the respective hard drive 1030.

The set of internal components 1000 may also include network adapters (or switch port cards) or interfaces 1036 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1036. From the network adapters (or switch port adaptors) or interfaces 1036, the instructions and data of the described programs or processes are loaded into the respective hard drive 1030. The network may comprise copper wires, optical fibers, wireless transmission, routers, firewalls, switches, gateway computers and/or edge servers.

The set of external components 1050 can include a computer display monitor 1070, a keyboard 1080, and a computer mouse 1084. The set of external components 1050 can also include touch screens, virtual keyboards, touch pads, pointing devices, and other human interface devices. The set of internal components 1000 also includes device drivers 1040 to interface to computer display monitor 1070, keyboard 1080 and computer mouse 1084. The device drivers 1040, R/W drive or interface 1032 and network adapter or interface 1036 comprise hardware and software (stored in storage device 1030 and/or ROM 1024).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Example Characteristics:

On-demand self-service: a cloud consumer can unilaterally provision computing capabilities, such as server time and network storage, as appropriate automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Example Service Models:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Example Deployment Models:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 11:
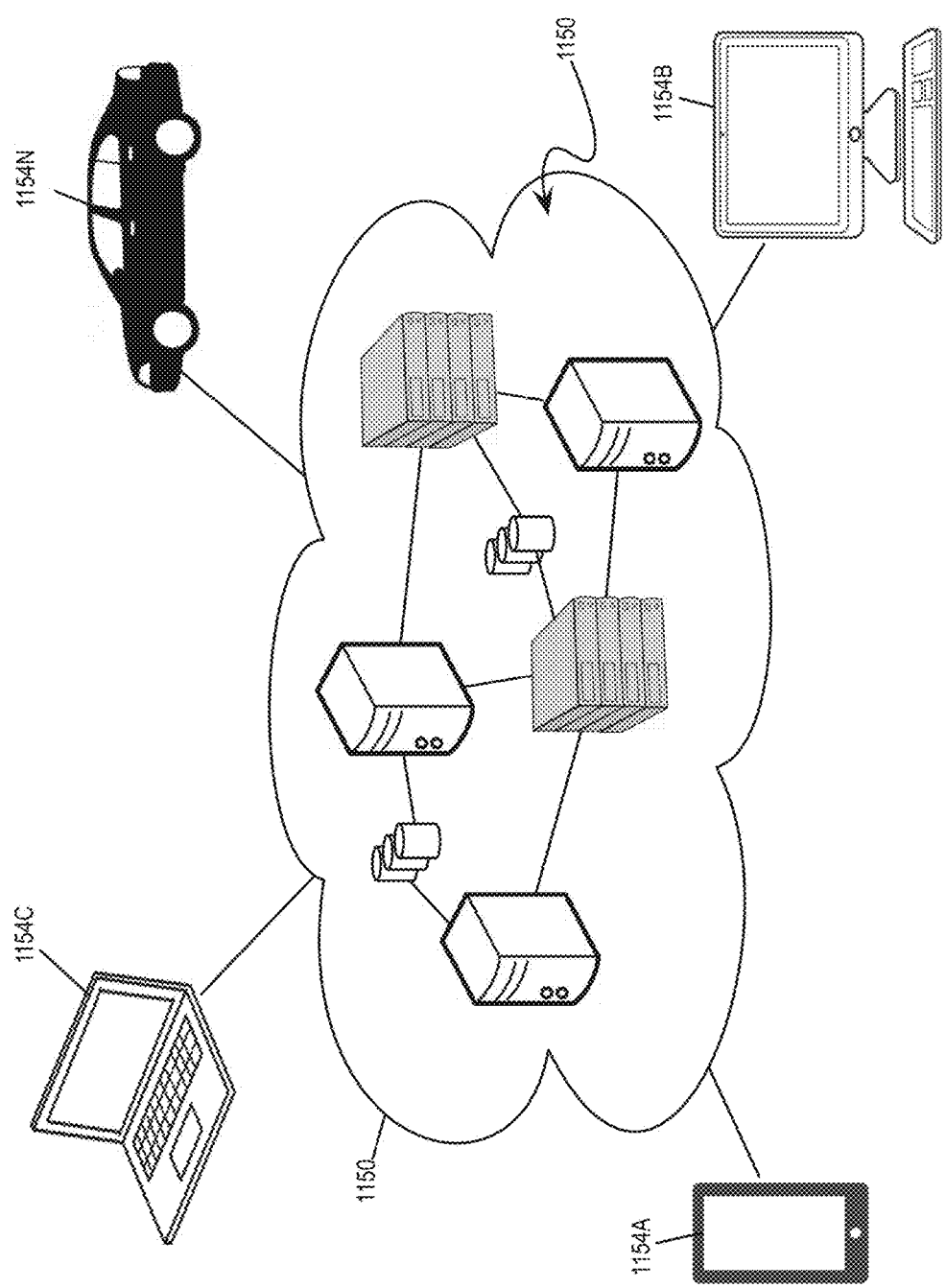
FIG. 11 illustrates a cloud-computing environment, consistent with an exemplary embodiment.

Reference now is made to FIG. 11, where an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
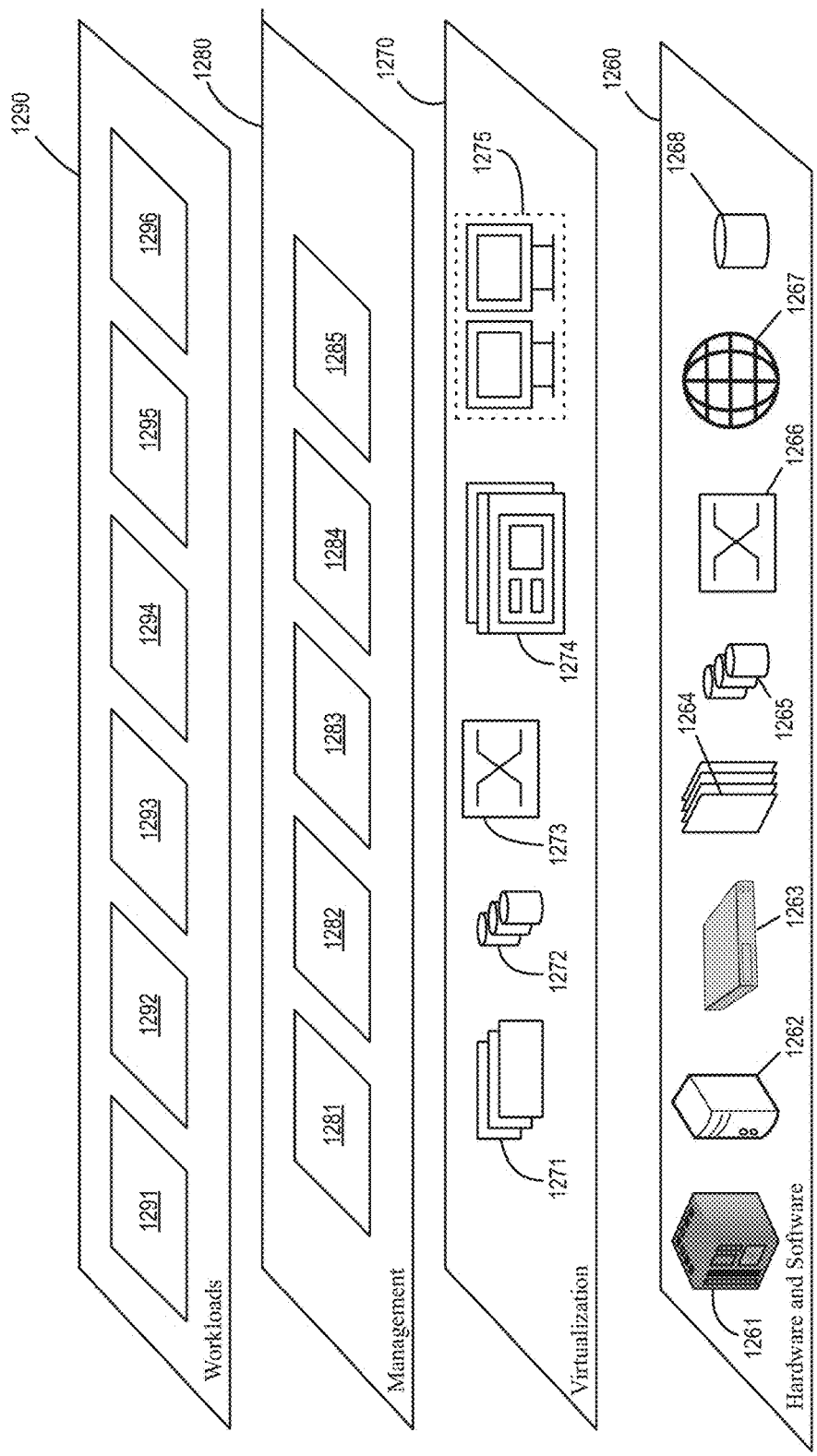
FIG. 12 illustrates a set of functional abstraction layers provided by a cloud-computing environment, consistent with an exemplary embodiment.

Referring now to FIG. 12, a set of functional abstraction layers provided by cloud computing environment 1150 (FIG. 11) is shown. It should be understood that the components, layers, and functions shown in FIG. 12 are intended to be illustrative only and embodiments of the disclosure are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud-computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and bare-metal server provisioning 1296. In some embodiments, the bare-metal server provisioning workload 1296 performs the functions of the customer portal 260 and the secure management tool 250 of the bare-metal server provisioning system as described above, i.e., to receive customer bare-metal machine provisioning request and to identify, enable, disable, and configure physical resources bare-metal servers in response to the bare-metal provisioning request.

The foregoing embodiments facilitate the provisioning of bare-metal server within a computer infrastructure by having one or more computing devices receive bare-metal server provisioning request. The computer infrastructure is then used to configure corresponding physical resources and physical switches.

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a request from a tenant to provision a tenant bare metal (BM) machine;
   providing a set of configuration data for configuring a BM server to implement the tenant BM machine according to the request, the BM server comprising physical resources and physical switches; and
   reporting to the tenant, physical resources in the BM server that are available for use by the tenant based on a profile of the tenant, wherein:
   the physical resources of the BM server exceed the requested tenant BM machine,
   the reporting hides physical resources that are not available for use by the tenant, and
   the set of configuration data allocates a set of the physical resources in the BM server for implementing the tenant BM machine and configures a set of the physical switches to electrically segregate the allocated set of physical resources from physical resources that are not allocated to the tenant.

2. The method of claim 1, wherein the request is a first request, wherein the tenant is a first tenant, the tenant BM machine is a first tenant BM machine, the set of configuration data is a first set of configuration data, and the allocated set of physical resources is a first allocated set of physical resources, the method further comprising:
   receiving a second request from a second tenant of the datacenter to provision a second tenant BM machine; and
   generating a second set of configuration data for configuring the BM server to implement the second tenant BM machine according to the second request,
   wherein the second set of configuration data allocates a second set of the physical resources in the BM server for implementing the second tenant BM machine and configures a set of the physical switches to electrically segregate the second allocated set of physical resources from physical resources not allocated to the second tenant.

3. The method of claim 2, further comprising installing a first operating system on the first allocated set of physical resources and installing a second operating system on the second allocated set of physical resources.

4. The method of claim 1:
   wherein the allocated set of physical resources comprises a set of central processing units (CPUs); and
   wherein the set of configuration data comprises an initialization program for configuring the set of CPUs.

5. The method of claim 4, wherein the at least one allocated physical resource is a central processing unit (CPU).

6. The method of claim 1, wherein the physical resources of the BM server comprise a set of central processing units, a set of input/output devices, and a set of memory structures.

7. The method of claim 1, further comprising receiving an operating system from the tenant and installing the operating system on the allocated set of physical resources.

8. The method of claim 1, wherein the configuration data further configures the physical switches to interconnect the allocated set of physical resources according to the received request.

9. The method of claim 1, wherein the data center comprises a set of BM servers and a set of VM (virtual machine) servers.

* * * * *